United States Patent
Boutroux et al.

(10) Patent No.: US 6,496,606 B1
(45) Date of Patent: Dec. 17, 2002

(54) STATIC IMAGE GENERATION METHOD AND DEVICE

(75) Inventors: Vincent Boutroux, Paris (FR); Michel Bonnet, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/366,696

(22) Filed: Aug. 4, 1999

(30) Foreign Application Priority Data

Aug. 5, 1998 (EP) .............................. 98401997
Jun. 15, 1999 (EP) .............................. 99401466

(51) Int. Cl.[7] .................................................. G06K 9/36
(52) U.S. Cl. ....................... 382/276; 382/284; 345/683
(58) Field of Search ................................ 382/276, 284, 382/285, 236, 173, 308, 243; 375/240.16; 345/629, 639, 640, 646, 648, 683, 647; 348/416.1, 407.1, 413.1

(56) References Cited

U.S. PATENT DOCUMENTS 5,943,445 A * 8/1999 Dufaux ....................... 382/236
5,999,662 A * 12/1999 Burt et al. ................... 382/284
6,037,988 A * 3/2000 Gu et al. .................. 375/240.16

* cited by examiner

Primary Examiner—Jose L. Couso
Assistant Examiner—Kanji Patel
(74) Attorney, Agent, or Firm—Russell Gross

(57) ABSTRACT

The invention relates to a method and device for generating a large static image M(n), such as a sprite or a mosaic, from a video sequence including successive video objects. This method comprises a first step for estimating motion parameters related to the current video object V0(n) of the sequence with respect to the previously generated static image M(n−1), a second step for warping this video object on the basis of the estimated motion parameters, and a third step for blending the warped video object WV0(n) thus obtained with the previously generated static image M(n−1). According to the invention, an additional step for computing, for each picture element of the current video object, a weighting coefficient $w_{WF(n)}[x,y]$ correlated to the error between the warped video object and the static image M(n−1) is provided, and the blending formula now takes into account said weighting coefficients.

2 Claims, 1 Drawing Sheet

STATIC IMAGE GENERATION METHOD AND DEVICE

FIELD OF THE INVENTION

The invention relates to a method for generating a large static image M(n), such as a sprite or a mosaic, from a video sequence including successive video objects VOs, said method comprising the steps of:
 (A) estimating motion parameters related to the current video object V0(n) of the sequence, with respect to the previously generated static image M(n−1);
 (B) warping said current video object V0(n), on the basis of said estimated motion parameters;
 (C) blending the warped video object WV0(n) thus obtained with the previously generated static image M(n−1); and to a corresponding device. This invention may be useful in relation with the MPEG-4 and MPEG-7 standards.

BACKGROUND OF THE INVENTION

The MPEG-7 standard has for object to standardize within some years generic ways to describe multimedia content, in view of a fast and efficient retrieval of data on the basis of various types of features such as text, color, texture, motion and semantic content. In this context, a mosaic can play a useful role. As indeed explained for instance in the article "Efficient representations of video sequences and their applications", M. Irani and al., Signal Processing: Image Communication, vol.8, 1996, pp.327–351, a mosaic image is constructed from all frames in a scene sequence, giving a panoramic view of said scene. It is possible to extract for instance from this panoramic view the main features of the sequence, such as chrominance or luminance histograms, objects shapes, global motion parameters, and so on.

The definition of a mosaic may be compared to that of a sprite, as used in the context of the MPEG-4 standard. As described for instance in the case of a sprite in the document WO 98/59497, which can be also applied to the case of a mosaic, three main steps may compose a sprite or mosaic generation (in the following, the generic word "static image" will therefore be used in place of sprite or mosaic). A motion estimation step is first provided, in order to find the motion parameters that allow to merge correctly a current frame F(n) with the static image M(n−1) already composed of the previous frames F(1), F(2), . . . , F(n−1). The inverse parameters are then computed, so that the current frame may be compensated in their direction; this second step is also called warping. The warped current frame F(n) is finally blended with M(n−1) in order to form a new accreted static image M(n), with which the next incoming frame F(n+1) will be merged, and so on.

SUMMARY OF THE INVENTION

It is an object of the invention to propose a static image generation method with an increased robustness to outliers.

To this end, the invention relates to a method such as described in the introductory paragraph of the description and which is moreover characterized in that:
 (1) said method also comprises, between said warping and blending steps, an additional step for computing, for each picture element of the current video object V0(n), a weighting coefficient $w_{WF(n)}[x,y]$ correlated to the error between the warped video object WV0(n) and the static image M(n−1) at each picture element [x,y];
 (2) the blending step provided for determining the newly generated static image M(n) takes into account said weighting coefficients according to the following blending formula, used for each pixel [x,y]:

$$M(n)[x,y] = \frac{w_{M(n-1)}[x,y] \cdot M(n-1)[x,y] + w_{WF(n)}[x,y] \cdot WF(n)[x,y]}{w_{M(n-1)} + w_{WF(n)}}$$

where the definitions of the terms are the following:
 (a) n>0
 (b) whatever (x,y), $w_{M(0)}=0$;
 (c) whatever (x,y), $w_{WF(n)}[x,y]=$ $$w_{WF(n)}[x,y] = \frac{1}{r(x,y)} \frac{d}{dr}\rho(r(x,y));$$

(d) $w_{M(n)} = w_{M(n-1)} + w_{WF(n)}$.

It is another object of the invention to propose a static image generation device for carrying out said method.

To this end, the invention relates to a device for generating a large static image M(n), such as a sprite or a mosaic, from a video sequence including successive video objects VOs, said device comprising:
 (A) a motion estimation circuit, provided for estimating a motion information related to the relative motion between the current video object V0(n) of the sequence and the previously generated static image M(n−1);
 (B) a warping circuit, provided for defining on the basis of said current video object and said motion information a warped video object WVO(n);
 (C) a blending circuit, provided for updating the static image, said previously generated static image M(n−1) being replaced by the new one M(n) generated by blending said previously generated static image M(n−1) and said warped video object; characterized in that:
  (1) said device also comprises a pixel-based weighting circuit, receiving the current video object V0(n) and the associated motion information and computing for each picture element of said current video object a weighting coefficient that depends on the error between the warped video object WVO(n) and the previously generated static image M(n−1) at each picture element [x,y];
  (2) the blending formula used in the blending circuit for determining the newly generated static image M(n) takes into account the computed weighting coefficients according to the following blending formula, used for each pixel [x,y]:

$$M(n)[x,y] = \frac{w_{M(n-1)}[x,y] \cdot M(n-1)[x,y] + w_{WF(n)}[x,y] \cdot WF(n)[x,y]}{w_{M(n-1)} + w_{WF(n)}}$$

where the definitions of the terms are the following:
 (a) n>0
 (b) whatever (x,y), $w_{M(0)}=0$;
 (c) whatever (x,y), $$w_{WF(n)}[x,y] = \frac{1}{r(x,y)} \frac{d}{dr}\rho(r(x,y));$$

(d) $w_{M(n)} = w_{M(n-1)} + w_{WF(n)}$.

The advantageous principle of the proposed method and device is that it is possible to accumulate confidence in the weight static image, in order not to take into account picture elements with low weight (i.e. outliers), which is carried out by summing for each picture element in the weight static image weights of the same picture element.

BRIEF DESCRIPTION OF THE DRAWINGS

The particularities and advantages of the invention will now be explained in a more detailed manner, with reference to the accompanying drawing in which.

DESCRIPTION OF THE INVENTION

Figure 1:
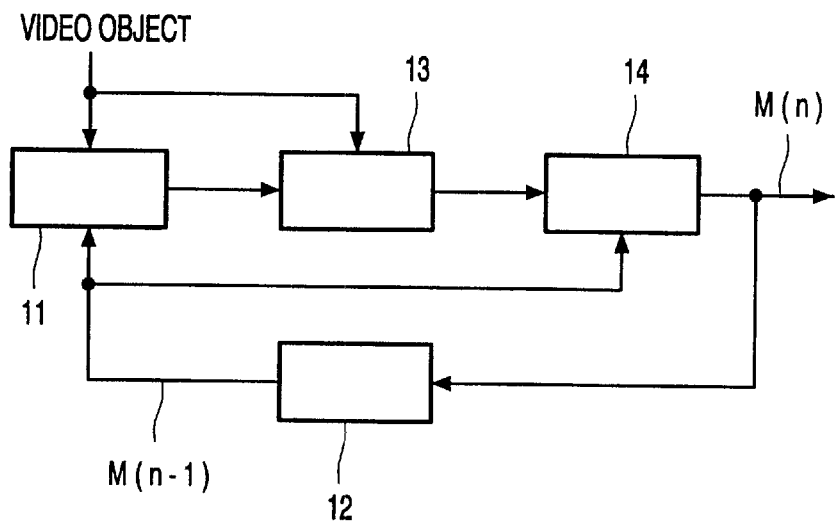
FIG. 1 shows a known scheme of a static image generation device.

A device for the implementation (for instance in the case of a mosaic) of the method described in the document WO 98/59497 is illustrated in FIG. 1. A motion estimation stage 11 receives successive video objects, in the present case successive frames F(1), F(2), F(3), . . . , F(i), . . . , F(n−1), F(n), and determines the motion parameters that will allow to merge correctly the incoming frame F(n) with the previously generated mosaic M(n−1) available in a memory 12 and already incorporating the previous frames F(1) to F(n−1). After having estimated these parameters, the inverse ones are computed in a warping circuit 13 that transforms the video object to the coordinate system of the mosaic M(n−1). A blending circuit 14 finally allows to build the new mosaic M(n) refreshing the old one M(n−1).

Figure 2:
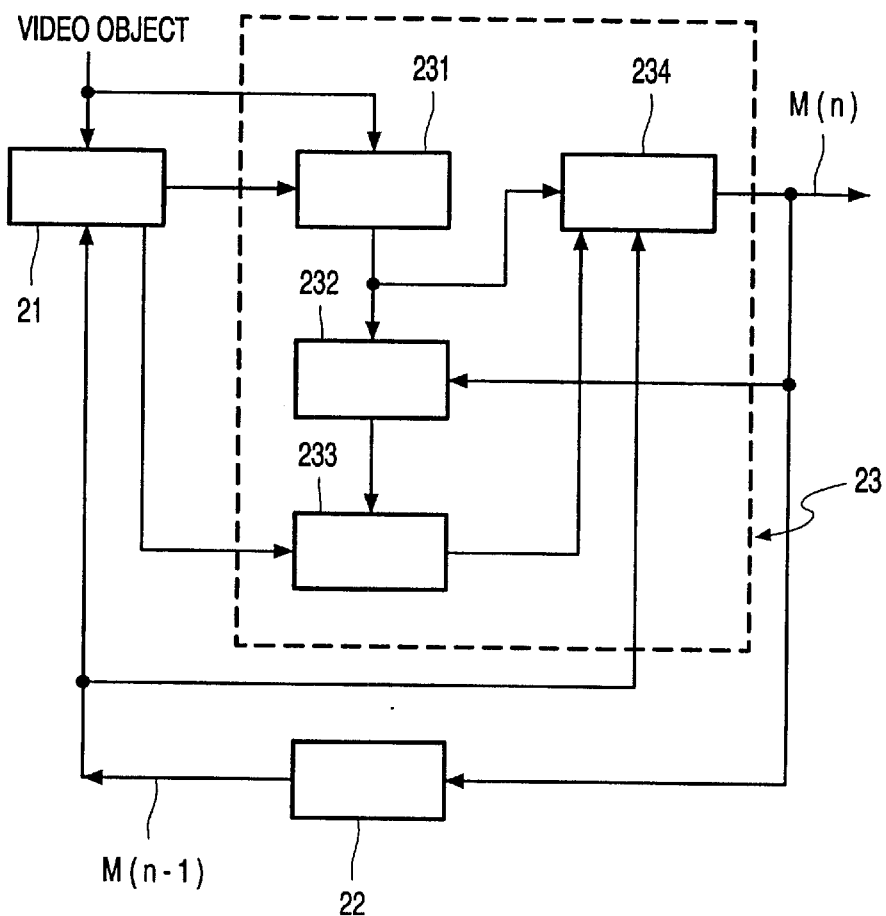
FIG. 2 shows an embodiment of a static image generation device allowing to implement the method according to the invention.

A device for the implementation of the method according to the invention (also in the case of a mosaic) is now illustrated in FIG. 2. A motion estimation stage 21 receives the successive video objects, in the present case successive frames F(1), F(2), F(3), . . . , F(i), . . . , F(n−1), F(n), and carries out the global motion estimation step necessary in order to find the motion parameters allowing to merge correctly the incoming frame F(n) with the previously generated mosaic M(n−1), available in a memory 22 and already incorporating the previous frames F(1) to F(n−1). A mosaic accretion stage 23 then allows to build the new mosaic M(n) refreshing the old one M(n−1).

An example of the estimation of motion parameters carried out in the stage 21 is for instance described in the document EP 0771115 (PHF96534). The values (Dx, Dy) designating the components of a motion vector from a frame to the following one, with Dx and Dy being functions of x and y whose coefficients are the requested motion parameters, it can be written L(x,y,t)=L(xDx, yDy, t−1), where t=time and L=luminance at a given point. The number of the coefficients defining the functions depend on the type of motion model considered. Different motion models can be used, the motion being in fact represented by the displacements of a given number of points. The MPEG-4 standard allows to use for example the following models:

translation: two parameters are needed, the relative object/camera motion being parallel to the image plane and every point of the object having a constant depth (that is the standard model used in the well known block matching method);

zoom, rotation, translation: four parameters, the objects moving only with arbitrary translations and rotations whose axis is perpendicular to the image plane;

affine transform: six parameters;

perspective motion: eight parameters.

The perspective model transforms a rectangle in some quadrilateral shape: the 2D positions of the four vertices of this shape completely define the eight parameters of the perspective projection. This model is preferably chosen because it allows more camera motion possibilities than the other ones. The motion estimation method which is then carried out in the motion estimation stage 21 may be for instance the Levenberg-Marquardt's motion estimator, that relies on a conventional gradient based approach in order to directly minimize the discrepancy in intensities between pairs of image (after applying the perspective transform, by iteratively modifying the eight parameters of the model). The cost function used by the Levenberg-Marquardt's motion estimator is preferably a mean square error weighted by M estimators (Lorentz function), as described for instance in the international patent application filed under the number PCT/IB98/00424 (PHF97550).

Once said motion estimation is done, the mosaic accretion stage 23 allows to warp the current frame F(n) and blend it with the mosaic. This stage 23 comprises the following circuits: a warping circuit 231, a pixel-based weighting circuit, and a blending circuit 234.

According to the invention, the pixel-based weighting circuit computes for every picture element (pixel) a weighting coefficient $w_{WF(n)}$, given by the following expression (1):

$$w_{WF(n)}[x, y] = \frac{1}{r(x, y)} \frac{d}{dr} \rho(r(x, y)) \qquad (1)$$

where ρ is the lorentzian M-estimator used in the motion estimation stage 21 and r(x,y) is the error between the warped current image and the mosaic at the pixel (x,y). The construction of the whole error map is done in an error map definition circuit 232 and the computation of the weighting coefficients in a coefficient computation circuit 233. The whole set of weighting coefficients thus computed by the pixel-based weighting circuit (232, 233) is then used by the blending circuit 234. In said circuit, a weight mean formula taking into account the weighting coefficients $w_{WF(n)}[x,y]$ is then used to calculate the luminance and chrominance values of the new mosaic M(n) resulting from the blending step. The blending formula (2) is indeed, for each pixel [x,y]:

$$M(n)[x, y] = \frac{w_{M(n-1)}[x, y] \cdot M(n-1)[x, y] + w_{WF(n)}[x, y] \cdot WF(n)[x, y]}{w_{M(n-1)} - w_{WF(n)}} \qquad (2)$$

where the definitions of the terms are the following:

(a) n>0

(b) whatever (x,y), $w_{M(0)}=0$;

(c) whatever (x,y), $$M(n)[x, y] = \frac{w_{M(n-1)}[x, y] \cdot M(n-1)[x, y] + w_{WF(n)}[x, y] \cdot WF(n)[x, y]}{w_{M(n-1)} + w_{WF(n)}} \qquad (2)$$

(d) $w_{M(n)}=w_{M(n-1)}+w_{WF(n)}$.

The invention such as described hereinabove is by no means limited to the embodiment mentioned and shown, and alternatives or improvements can be proposed on the basis thereof.

It must for instance be indicated that the invention is not dependent of the type of the video sequence. In the described example, the video sequence comprises successive frames F(1), F(2), . . . , F(n−1), F(n) of rectangular shape, but it is clear that it may comprise any type of video objects, for example video objects (VOs) of any type of shape such as defined in relation with the MPEG-4 standard according to object-oriented segmentation schemes. The term "video object" will be therefore chosen as representing here any type of video information such as processed according to the method and device described hereinabove, and such video objects will be designated by the references V0(1), V0(2), ..., V0(n−1), V(n).

What is claimed is:

1. A method for generating a large static image M(n), such as a sprite or a mosaic, from a video sequence including successive video objects VOs, said method comprising the steps of:

(A) estimating motion parameters related to the current video object V0(n) of the sequence, with respect to the previously generated static image M(n−1);

(B) warping said current video object V0(n), on the basis of said estimated motion parameters;

(C) blending the warped video object WV0(n) thus obtained with the previously generated static image M(n−1);

characterized in that:

(1) said method also comprises, between said warping and blending steps, an additional step for computing, for each picture element of the current video object V0(n), a weighting coefficient $w_{WF(n)}[x,y]$ correlated to the error between the warped video object WV0(n) and the static image M(n−1) at each picture element [x,y];

(2) wherein the blending step takes into account said weighting coefficients according to a blending formula for determining the static image M(n), the blending formula being defined as follows for each pixel [x,y]:

$$M(n)[x, y] = \frac{w_{M(n-1)}[x, y] \cdot M(n-1)[x, y] + w_{WF(n)}[x, y] \cdot WF(n)[x, y]}{w_{M(n-1)} + w_{WF(n)}}$$

where the definitions of the terms are the following:
(a) n>0
(b) whatever (x,y), $w_{M(0)}=0$;
(c) whatever (x,y), $w_{WF(n)}[x,y]=$ $$w_{WF(n)}[x, y] = \frac{1}{r(x, y)} \frac{d}{dr} \rho(r(x, y));$$

(d) $w_{M(n)} = w_{M(n-1)} + w_{WF(n)}$.

2. A device for generating a large static image M(n), such as a sprite or a mosaic, from a video sequence including successive video objects VOs, said device comprising:

(A) a motion estimation circuit, provided for estimating a motion information related to the relative motion between the current video object V0(n) of the sequence and the previously generated static image M(n−1);

(B) a warping circuit, provided for defining on the basis of said current video object and said motion information a warped video object WV0(n);

(C) a blending circuit, provided for updating the static image, said previously generated static image M(n−1) being replaced by the new one M(n) generated by blending said previously generated static image M(n−1) and said warped video object;

characterized in that:

(1) said device also comprises a pixel-based weighting circuit, receiving the current video object V0(n) and the associated motion information and computing for each picture element of said current video object a weighting-coefficient that depends on the error between the warped video object WV0(n) and the previously generated static image M(n−1) at each picture element [x,y];

(2) wherein the blending circuit takes into account the computed weighting coefficients according to a blending formula for determining the static image M(n), the blending formula being defined as follows for each pixel [x,y]:

$$M(n)[x, y] = \frac{w_{M(n-1)}[x, y] \cdot M(n-1)[x, y] + w_{WF(n)}[x, y] \cdot WF(n)[x, y]}{w_{M(n-1)} + w_{WF(n)}}$$

where the definitions of the terms are the following:
(a) n>0
(b) whatever (x,y), $w_{M(0)}=0$;
(c) whatever (x,y), $w_{WF(n)}[x,y]=$ $$M(n)[x, y] = \frac{w_{M(n-1)}[x, y] \cdot M(n-1)[x, y] + w_{WF(n)}[x, y] \cdot WF(n)[x, y]}{w_{M(n-1)} + w_{WF(n)}}$$

(d) $w_{M(n)} = w_{M(n-1)} + w_{WF(n)}$.

* * * * *